UNITED STATES PATENT OFFICE.

DU BOIS D. PARMELEE, OF SALEM, ASSIGNOR TO BEVERLY RUBBER COMPANY, OF BEVERLY, MASSACHUSETTS, ASSIGNOR TO JOHN H. CHEEVER, OF NEW YORK, N. Y.

IMPROVEMENT IN RESTORING WASTE VULCANIZED RUBBER.

Specification forming part of Letters Patent No. 30,181, dated September 25, 1860.

*To all whom it may concern:*

Be it known that I, DU BOIS D. PARMELEE, of Salem, in the county of Essex and State of Massachusetts, have invented a new and useful improvement in rendering waste vulcanized, hermized, and changed or converted india-rubber and india-rubber compounds useful and capable of being reworked for the manufacture of a great variety of articles of trade and commerce; and I do hereby declare that the following is a full, clear, and exact description thereof.

Previously to describing my said invention I would remark that the treatment of india-rubber or of its compounds by any of the vulcanizing or hermizing processes, produces certain changes in the properties of the rubber or its compounds, whereby while its elasticity is made permanent—that is, at ordinary temperatures—it is divested of its peculiar adhesiveness and plasticity, which are the principal properties that enable it to be worked into sheets and fashioned into the many useful articles to which india-rubber is or may be applied. To impart again to the india-rubber these properties which it has lost by being vulcanized or hermized, or treated in any other method whereby the change above referred to is produced, is the object of my invention.

The nature of my invention therefore consists in a new method of rendering waste vulcanized, hermized, or changed india-rubber or its compounds, cohesive, plastic, and susceptible of being manufactured into a variety of useful articles by means of a simple and comparatively inexpensive process, the practice of which is attended with no danger to operatives, and is easily controlled and may be practiced by ordinary workmen at a saving of much labor as compared with what is now required to carry out the processes that have hitherto been practiced for the same purposes; and in order that my invention may be fully understood, I shall now proceed to describe it minutely and particularly, premising, however, that its general character consists in reducing waste vulcanized, hermized, or changed rubber, or its compounds into fine particles and subjecting them, with or without heat, by incorporation, impregnation, or other method of effecting the required admixture to the action of the products derived from heating, melting, burning, or distilling india-rubber, and applied either separately or combined, whether the said rubber be vulcanized or hermized or not, and whether combined with other substances or not.

Of the different modes that may be adopted for carrying my invention into effect I shall here describe those which, from experience, I have found to be most practicable and expeditious.

I take waste vulcanized, hermized, or changed india-rubber, or rubber compounds which have been treated by the vulcanizing, hermizing, or changing processes, and reduce either or all of these by any suitable means into a fine state—the finer the better—and then subject this powder to the influence of either or all of the products produced by the action of heat on native rubber, which products consist of a series of oily and liquid substances, varying in consistency, color, and transparency according to the degree of heat applied and the means employed for their refining and rectification.

The products derived by heat from vulcanized, hermized, or changed rubber may be combined with or substituted for the products of native rubber, if preferred. By first mixing and then thoroughly grinding or otherwise intimately incorporating these oily and liquid products with the powder obtained, as above mentioned, from the waste vulcanized or hermized rubber a rubber mass or composition is produced which is sufficiently adhesive and plastic to admit of being worked into sheets and fashioned into the various articles of trade and commerce to which india-rubber is usually applied. The simplest method of forming and applying these products is to melt the rubber (whether it be native or not) and combine it with the powder of the vulcanized rubber in proportions varying according to the nature of the goods to be produced. For ordinary purposes the proportion of four ounces of melted rubber to one pound of pulverized rubber will answer.

I would here observe that the incorporation above mentioned is more perfectly effected by pausing after mixing the powder with the products to allow time for the proper action of the melted caoutchouc upon the grains of the powdered vulcanized or hermized rubber, and by grinding the mass afterward between rollers, at which stage it may be, if desirable, adulterated with resins, solid hydrocarbons, oxides of lead, tin, zinc, lamp-black, in proportions varying with the objects or purposes of the composition.

It is necessary here to describe the manner or process of working the composition thus obtained. It will be sufficient to mention that it may be shaped into any desired forms by molding it under pressure as well known and understood in the working of other rubber and plastic materials generally, or it may be run into sheets or be spread on cloth by means of the calenders now used for spreading crude india-rubber. The goods thus produced should then be dried by exposing them to the sun or in a chamber to artificial heat, varying in temperature according to the thickness and quality of the sheet.

From the foregoing description of my invention for rendering waste vulcanized india-rubber useful and adapted to be reworked it will be perceived that it is susceptible of many modifications. Thus another and more perfect but not quite as cheap a mode or method of proceeding is to mix with the powdered vulcanized rubber the products of distillation of rubber which are of a more oily and liquid character, and known to chemists as "caoutchoucine" "caoutchine," which is the rectified product of caoutchoucine, "caoutchen," and "heveen," instead of the melted rubber, as previously described. These more liquid and oily products may be derived from vulcanized, hermized, or changed rubber, as well as from native rubber, excepting that the products derived from the former contain in small quantities sulphur both in chemical and mechanical combination, which sulphur, however, is in no wise objectionable.

Under this method of proceeding, as in the previous one, the proportions of the powdered rubber and products of distillation of the rubber ought to be varied according to the ultimate purpose it is designed to apply the compound to, also according to the quality of the powdered rubber as affected by the admixture with it of foreign substances. I have found one ounce of the liquid to one pound of the powder to be an average. I have also found that if heat ranging from 200° Fahrenheit and upward be applied to this mixture for a few minutes only it will greatly facilitate the softening of the vulcanized-rubber powder.

A third modification of my invention or method of proceeding whereby the same result may be produced in a more expeditious manner is by passing the vapors of either or all of these oily and liquid products through the powdered vulcanized rubber. This I have sometimes effected by leading a pipe directly from the retort employed for distilling the rubber into a closed vessel containing the powdered rubber to be acted upon; and I have also effected the same result by volatilizing the said liquid and oily product, and impregnate the vulcanized rubber powder with the vapor.

In the foregoing description of my invention I have not particularly specified the several products obtained by submitting caoutchouc, either in its crude or changed state, to the action of heat. It will be sufficient for the perfect understanding of my invention to state that in the progress of the destructive distillation or decomposition of caoutchouc by the action of heat several and distinct products are derived, either or all of which, or any of them combined, may be advantageously used, according to the manner it or they are applied and according to the ultimate purpose for which the composition is designed. I therefore do not intend to limit myself to any one or more of those products in particular, but wish to be understood as claiming the use for the purposes specified of all the sticky, tarry, oily, and liquid products, either separately or combined, obtained by the action of heat on rubber or caoutchouc, whether the same be native or crude, or whether it be vulcanized, hermized, or changed.

It is obvious, too, that native rubber may be combined with waste vulcanized rubber at any stage of the process described without departing from the principle of my invention.

I claim—

The process herein described of rendering waste vulcanized, hermized, or changed india-rubber useful and capable of being reworked for the manufacture of articles of trade and commerce by reducing said rubber to a fine or powdered state, and then combining with the same india-rubber which has been modified by heat so as to obtain it either in a semi-liquid or melted condition or in a liquid or vaporous condition—*i. e.*, in the form of its products of distillation—substantially in the manner and modes herein set forth.

In testimony whereof I have signed my name to this specification before two subscribing witnesses.

DU BOIS D. PARMELEE.

Witnesses:
A. POLLOK,
EDM. F. BROWN.